United States Patent [19]

Ng et al.

[11] Patent Number: 5,739,841
[45] Date of Patent: Apr. 14, 1998

[54] APPARATUS AND METHOD FOR GREY LEVEL PRINTING WITH UNIFORMITY CORRECTION

[75] Inventors: Yee Seung Ng, Fairport; Hieu Trong Pham, Webster, both of N.Y.

[73] Assignee: Eastman Kodak Company, Rochester, N.Y.

[21] Appl. No.: 579,749

[22] Filed: Dec. 28, 1995

[51] Int. Cl.$^6$ .................. B41J 2/435; B41J 2/47
[52] U.S. Cl. .................. 347/237; 347/125; 347/131; 347/240
[58] Field of Search .................. 347/120, 123, 347/125, 131, 236, 237, 232, 240; 358/298; 395/109, 115, 108

[56] References Cited

U.S. PATENT DOCUMENTS

| | | |
|---|---|---|
| 4,074,320 | 2/1978 | Kapes, Jr. . |
| 4,455,562 | 6/1984 | Dolan et al. . |
| 4,473,029 | 9/1984 | Fritz et al. . |
| 4,546,060 | 10/1985 | Miskinis et al. . |
| 5,025,322 | 6/1991 | Ng .................. 358/298 |
| 5,177,500 | 1/1993 | Ng .................. 347/245 |
| 5,253,934 | 10/1993 | Potucek et al. . |
| 5,255,013 | 10/1993 | Ng et al. . |
| 5,285,220 | 2/1994 | Suzuki et al. .................. 347/14 |
| 5,300,960 | 4/1994 | Pham et al. . |
| 5,327,524 | 7/1994 | Ng .................. 395/108 |
| 5,384,646 | 1/1995 | Godshalk et al. . |
| 5,493,322 | 2/1996 | Ng et al. .................. 347/240 |
| 5,585,836 | 12/1996 | Pham et al. .................. 347/237 |
| 5,586,055 | 12/1996 | Ng et al. .................. 364/526 |
| 5,657,069 | 8/1997 | Kelley et al. .................. 347/237 |
| 5,666,150 | 9/1997 | Ajewole .................. 347/240 |

*Primary Examiner*—Adolf Berhane
*Attorney, Agent, or Firm*—Norman Rushefsky

[57] ABSTRACT

A non-impact printer apparatus includes a printhead having a plurality of recording elements. Nonuniformities in emission characteristics of the recording elements are corrected using look-up tables (LUT) assemblages that include a first LUT wherein the recording elements are binned in accordance with bin values associated with their emission characteristics and a second LUT wherein bin values, output from the first LUT are used to address various tables providing exposure correction. The first and second LUTs are advantageously dual port RAM devices that allow operation during printing while simultaneously allowing loading of data into the tables for use for subsequent printing. Thus, process conditions may be continually monitored and correction data updated without delaying of current printing which may occur using correction data already stored in the LUT assemblages.

12 Claims, 9 Drawing Sheets

APPARATUS AND METHOD FOR GREY LEVEL PRINTING WITH UNIFORMITY CORRECTION

CROSS-REFERENCE TO RELATED APPLICATIONS

This application is related to U.S. application Ser. No. 08/579749 filed on even-date herewith in the names of Ng et al and entitled "Apparatus and Method for Grey Level Printing With Improved Correction of Exposure Parameters U.S. Ser. No. 08/580,263 filed Dec. 28, 1995".

BACKGROUND OF THE INVENTION

1. Field of the Invention

This invention relates to non-impact printing and more particularly to a method and apparatus for non-impact printing using printheads with plural recording elements wherein correction is required to provide uniformity in recording by the recording elements.

2. Description of the Prior Art

In the prior art of non-impact printing such as with use of LED printheads, examples of which may be found in U.S. Pat. Nos. 5,255,013 and 5,253,934, it is known that correction of the recording elements; i.e., LEDs, is often required due to non-uniformity in light output of these elements. Typically, a non-uniformity correction look-up table (LUT) is provided to adjust exposure times so that at any one required grey level all the LEDs can be enabled to output a uniform amount of exposure energy. This can be achieved by adjusting exposure times and/or intensities so that weaker emitters are enabled, say, for longer exposure times than stronger emitters so that the exposure energy from each emitter is uniform. As noted in the above patents, calibration for non-uniformity requires a number of steps, the results of which are stored in a non-uniformity correction look-up table so that grey level image data may be modified. In the case of a copier and/or printer having more than one color recording mode and/or more than one bit depth of input image data defining grey level (e.g. different images may be defined with grey level data of 1, 2 or 4-bits per pixel and/or with different image types (text, picture and halftone inputs), a problem is presented in changing the exposure parameters without the need to hold up or delay printing. Still other conditions affect the uniformity parameters such as environmental conditions which may require a different exposure vs. grey level curve for high quality printing. In addition, with very high speed printing, one may need to update the exposure conditions based on changing electrophotographic behavior via a process control input (which inputs 16 exposure values in a 4-bits per pixel grey level system per each operation condition.

It would, therefore, be desirable to provide for a method and apparatus for non-impact printing with improved ability to effect changes in uniformity correction.

SUMMARY OF THE INVENTION

In accordance with one aspect of the invention there is provided a non-impact printer apparatus comprising a printhead, including a plurality of recording elements, for recording image data, the recording elements emitting radiation for recording on a recording medium; correction means for correcting for nonuniformities in the recording elements, said correction means including: (a) a first dual port read/write look-up table memory means for storing bin data representing bin numbers based on emission characteristic of the recording elements, wherein at N addresses in said memory means, bin data, representing M different bin value numbers are stored, wherein N and M are each plural numbers and N>M, said first memory means having an output for outputting signals representing bin value numbers; (b) a second dual port read/write look-up table memory means storing corrected exposure data in plural tables, said second memory means having one address input connected to the output of the first memory means for outputting a signal representing corrected exposure data from one of the plural tables; (c) means for providing grey level image data of a pixel to be printed to said one address input of said second memory means; and (d) means responsive to a change in a process condition for selecting a different table of corrected exposure data in said second memory means for use in outputting corrected exposure data.

In accordance with another aspect of the invention, there is provide a method for correcting for nonuniformities in a printhead having a plurality of recording elements, said method comprising (a) storing in a first dual port read/write look-up table memory bin data representing bin value numbers based on emission characteristic of the recording elements, wherein at N addresses in said memory, bin data, representing M different bin value numbers are stored, wherein N and M are each plural numbers and N>M; (b) storing in a second dual port read/write look-up table memory corrected exposure data in plural tables; (c) providing grey level image data of a pixel to be printed to said second memory means; (d) in response to bin data and grey level image data from one of the tables outputting from said second memory, a signal representing corrected exposure data from one of the tables; and (e,) in response to a change in a process condition selecting a different table of corrected exposure data in said second memory means for use in outputting corrected exposure data.

The above and other objects and features of the present invention will become apparent from the following description taken in conjunction with the accompanying drawings;.

BRIEF DESCRIPTION OF THE DRAWINGS

FIG. 8 and 8A, 8B and 8C illustrate a flowchart for generating correction data for correcting nonuniformities in emission of recording elements on the printhead of FIG. 6.

DESCRIPTION OF THE PREFERRED EMBODIMENT

Because apparatus of the general type; described herein are well known the present description will be directed in particular to elements forming part of, or cooperating more directly with, the present invention.

Figure 1:
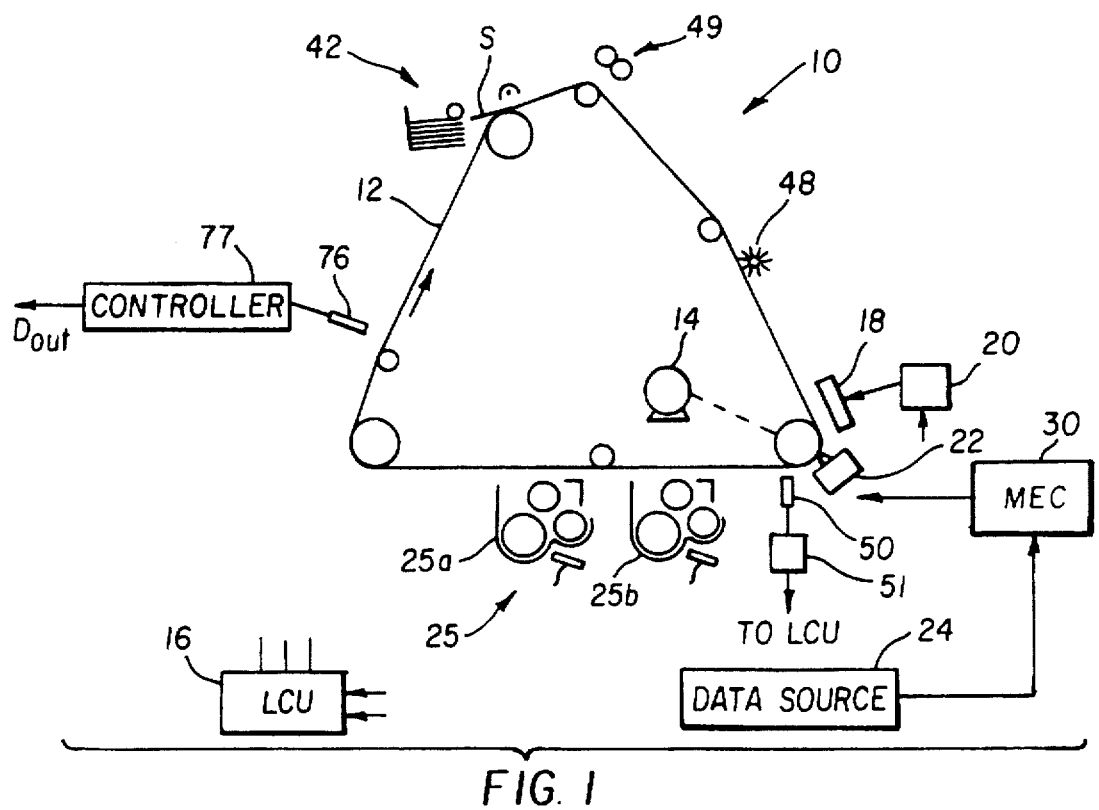
FIG. 1 is a diagram of an electrophotographic recording apparatus of the invention.

With reference to the copier/printer apparatus 10 as shown in FIG. 1, a moving recording member such as photoconductive belt 12 is driven by a motor 14 past a series of work stations of the printer. A logic and control unit (LCU) 16, which has a digital computer, has a stored program for sequentially actuating the; work stations.

Briefly, a charging station 18 sensitizes belt 12 by applying a uniform electrostatic charge of predetermined primary voltage $V_O$ to the surface of the belt. The output of the charger is regulated by a programmable controller 20, which is in turn controlled by LCU 16 to adjust primary voltage $V_O$ for example through control of electrical potential ($V_{grid}$) to a grid that controls movement of charges from charging wires to the surface of the recording member as is well known.

At an exposure station, projected light from a non-impact write head 22 dissipates the electrostatic charge on the photoconductive belt to form a latent image of a document to be copied or printed. The write head or printhead has an array of recording elements preferably light-emitting diodes (LEDs) or other light or radiation-emitting sources for exposing the photoconductive belt picture element (pixel) by picture element with an intensity regulated by current drivers on the printhead and as will be described in more detail below.

Image data for recording is provided by a data source 24 for generating electrical image data signals such as a computer, a document scanner, a memory, a data network facsimile, word processor, data reader, etc. Signals from the data source and control signals from the LCU are provided to a marking engine controller (MEC) 30. The marking engine controller responds to these signals to generate signals for output to the printhead for controlling selective enablement of the LEDs. Light from the LEDs may be focused by a suitable lens for imaging upon the electrostatically charged belt 12. The printhead in addition to recording image information is also adapted to record process control patches that are recorded usually in an interframe between recorded images for testing to determine a need to adjust process control parameters. In order to form patches with density, the LCU or MEC 30 may be provided with ROM or other memory representing data for creation of a patch. Travel of belt 12 brings the areas bearing the electrostatic latent images into a development area 25. The development area may have one or more magnetic brush development stations 25a, 25b. Each station has a magnetic brush in juxtaposition to, but spaced from, the travel path of the belt. Magnetic brush development stations are well known. For example, see U.S. Pat. Nos. 4,473,029 to Fritz et al and U.S. Pat. No. 4,546,060 to Miskinis et al. The two stations 25a, 25b are provided to selectively provide respective different color toners for development of recorded images on the belt 12.

LCU 16 selectively activates the appropriate development station in relation to the passage of the image areas containing latent images to selectively bring the magnetic brush into engagement with or a small spacing from the belt. The charged toner particles of the engaged magnetic brush are attracted imagewise to the latent image pattern to develop the pattern.

As is well understood in the art, conductive portions of the development station, such as conductive applicator cylinders, act as electrodes. The electrodes are connected to a variable supply of D.C. potential $V_B$ regulated by a programmable controller (not shown). Details regarding the development station are provided as an example, but are not essential to the invention.

A transfer station 42 as is also well known is provided for moving a receiver sheet S into engagement with the photoconductor in register with the image for transferring the image to a receiver. Alternatively, an intermediate member may have the image transferred to it and the image may then be transferred to the receiver. A cleaning station 48 is also provided subsequent to the transfer station for removing toner from the belt 12 to allow reuse of the surface for forming additional images. In lieu of a belt, a drum photoconductor or other structure for supporting an image may be used. After transfer of the unfixed toner images to a receiver sheet, such sheet is transported to a fuser station 49 where the image is fixed.

The LCU provides overall control of the apparatus and its various subsystems as is well known. Programming commercially available microprocessors is a conventional skill well understood in the art. The following disclosure is written to enable a programmer having ordinary skill in the art to produce an appropriate control program for such a microprocessor. In lieu of only microprocessors the logic operations described herein may be provided by or in combination with dedicated or programmable logic devices.

Process control strategies generally utilize various sensors to provide real-time control of the electrostatographic process and to provide "constant" image quality output from the user's perspective.

One such sensor may be a densitometer 76 to monitor development of test patches in non-image areas of photoconductive belt 12, as is well known in the art. The densitometer is intended to insure that the transmittance or reflectance of a toned patch on the belt is maintained. The densitometer may consist of an infrared LED which shines through the belt or is reflected by the belt onto a photodiode. The photodiode generates a voltage proportional to the amount of light received. This voltage is compared by controller 77 to the voltage generated due to transmittance or reflectance of a bare patch, to give a signal representative of an estimate of toned density. This signal $D_{out}$ furnished to the LCU is transmitted to the LCU and may be used by the LCU in accordance with a program stored therein to adjust $V_O$, $E_O$, or $V_B$. In addition to measuring density an electrometer 50 may be provided to measure the charge remaining after exposure but prior to development of the patch. The measured charge signal is also provided to the LCU for use in adjustment of the various process control parameters.

The density signal $D_{out}$ may be used to detect short term changes in density of a measured patch to control primary voltage $V_O$, $E_O$ and/or $V_B$. To do this, $D_{out}$ is compared with a set point density value or signal D (SP) and differences between $D_{out}$ and D(SP) cause the LCU to change settings of $V_{grid}$ on charging station 18 or adjust exposure through modifying exposure duration or light intensity for recording a pixel and/or adjustment to the potentials $V_B$ at the two development stations. These changes are in accordance with values stored in the LCU memory, for example, as a look-up table. In accordance with the invention, changes required for operation of the printhead exposure parameters are provided in an efficient way to minimize delays in printing.

Figure 2:
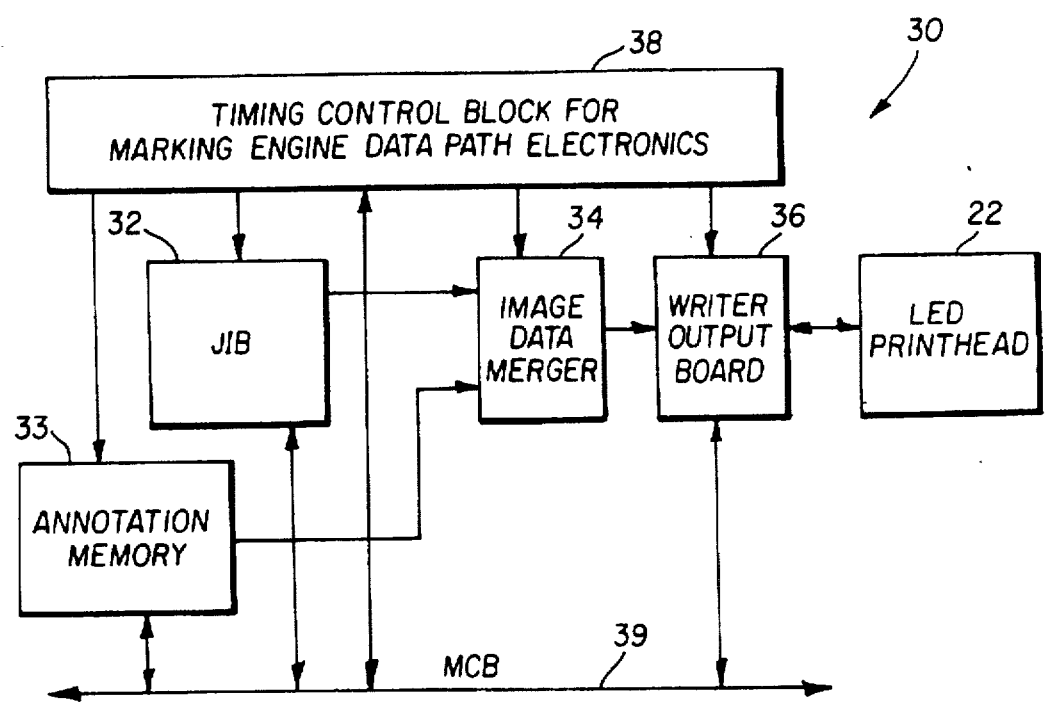
FIG. 2 is a block diagram of an image data path in a portion of the apparatus of FIG. 1.
Figure 6:
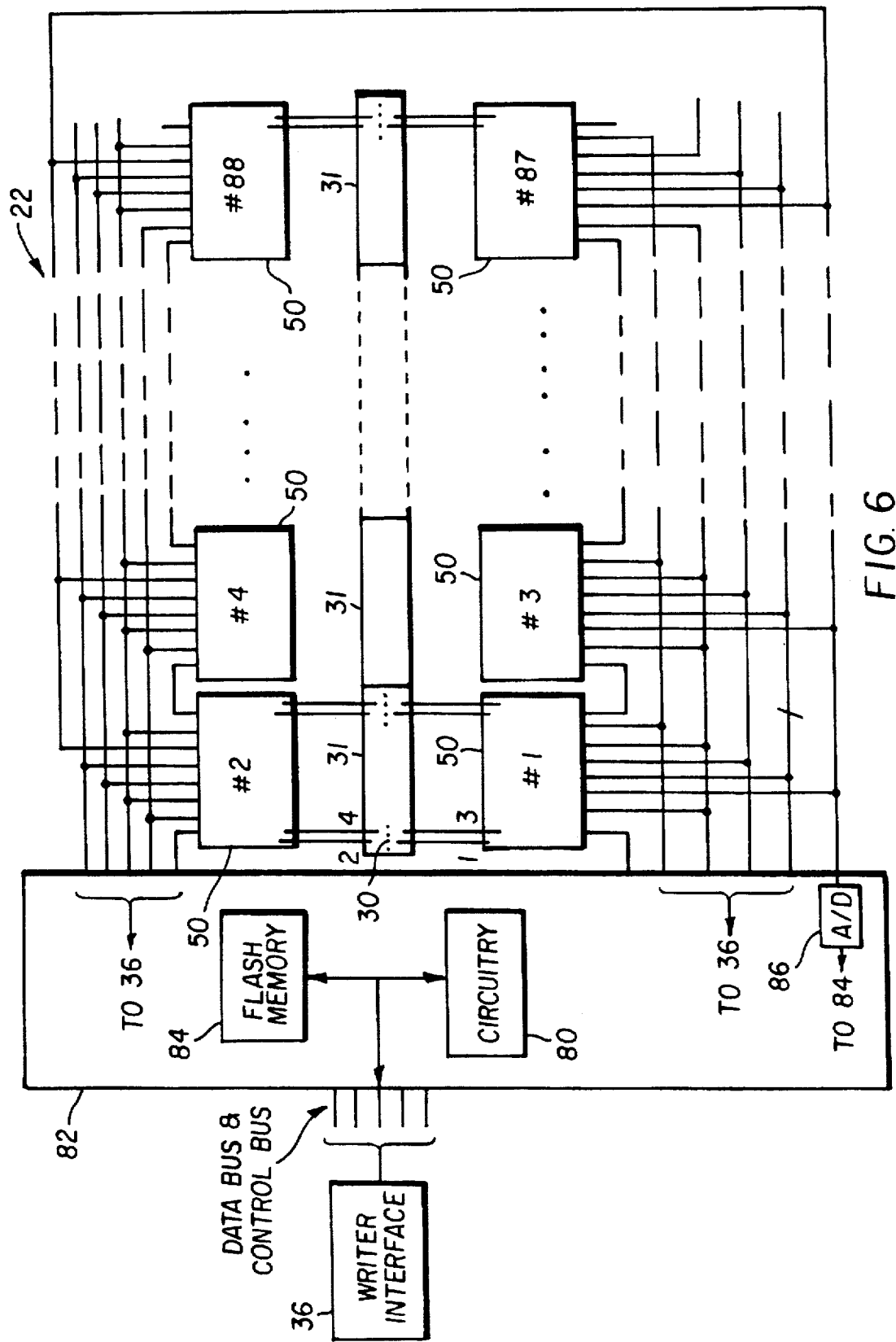
FIG. 6 is a block diagram of a printhead that receives corrected image data signals from a writer interface that is formed in accordance with the invention.

With reference now to FIG. 2, a block diagram schematic of a marking engine controller's data path in accordance with the invention is provided. The marking engine controller 30 includes a job image buffer (JIB) 32 into which rasterized data received from data source 24 is stored for example in compressed form. Data from data source 24 is compressed, stored in a multipage image buffer and expanded for output from the JIB. Several pages of data for each job can be stored to allow for reproducing multiple copy sets. An example of a job image buffer is described in U.S. Pat. No. 5,384,646. When a production job is stored in the JIB is to be printed, the image data is output to an image data merger device 34 wherein the data in the JIB can be merged with annotation data such as logos, time and date stamps, addresses, etc., stored in a nonvolatile annotation data memory 33. The merger may be logic devices and buffers or other known devices for performing this function or the merger device may be deleted. The image data whether merged with additional data to be printed or not merged is then output to a writer-interface (WIF) output board 36 that is in accordance with the invention. The WIF 36 modifies the image data before sending to the printhead 22 so that the data, for each pixel to be recorded by an LED on the printhead is adjusted to also control uniformity of that LED. An example of a grey level LED printhead that may be provided with corrected image data signals is disclosed in U.S. Pat. No. 5,253,934, the contents of which are incorporated herein by reference. As noted in this patent and with reference to FIGS. 6 and 7, corrected image data and control signals, such as clock signals, token signals, latch signals, power, etc. are sent to the printhead from the writer-interface 36 over a data bus and control bus. The data and control signals are input into driver chips 50 which are located on each side of a line of LED chip arrays 31. Each LED chip army includes for example 128 LEDs arranged in a line. The chip arrays are butted together to provide a single row of several thousand LEDs. The driver chips 50 receive the data and control signals and are used to generate current for driving the LEDs to which the driver chips are electrically connected. Within each driver chip, the corrected image data is latched in respective image data latch or storage registers 51 and an exposure period for recording a pixel is commenced and the duration of currents to respective LEDs determined by comparison by a comparator 52 of corrected image data signals with an output of a counter 53 that is counting exposure clock pulses. Control of current in each of plural driver channels is provided to respective LEDs on the printhead by a constant current driver that forms a part of a current mirror having a master circuit 55 that generates a controlled amount of current in response to digital current control data that is also sent to the printhead. In response to this current control data certain current-conducting transistors are enabled in the master circuit to cause a net current to flow in the master circuit and this net current is related to the current control data denoted in U.S. Pat. No. 5,253,934 as VREF and RREF. In the aforementioned patent, the term "VREF" refers to a current control data of 8-bits size that is provided identically to all the driver chips that are on the printhead while the term "RREF" refers to current control data of 8-bits size that may differ from driver chip to driver chip on the same printhead. As noted in the aforementioned patents, a row of say 128 LEDs may be formed on each chip array and a series of these arrays are assembled on a suitable support to provide a printhead with a single row of LEDs that are of several thousand LEDs. Each LED chip array may have one or preferably two driver chips associated therewith and mounted adjacent thereto for providing current to LEDs selected for energization to record a pixel. In response to selection or enablement of an LED a current is generated in a current-generating channel of the driver chip and this current energizes the respective LED to emit light for a period of time related to the corrected image data signal. The current to the; LED mirrors, i.e., is proportional to or related to that in the driver chip master circuit. Thus, effective control of the LED is provided with say 6-bits per pixel of image data to define a recording duration and 16-bits of current control data used to control current thereto. As the term VREF describes current control data that is applied to all the driver chips, it will hereinafter be referred to as GREF current control data to more precisely describe its characteristic as a "global reference" voltage generating data, whereas RREF will be referred to as LREF in view of its being "local reference" voltage generating data; i.e. it may vary from driver chip to driver chip on the printhead.

The WIF board 36 thus provides to the printhead 22 in addition to corrected image data signals, control and timing signals such as current control data GREF and LREF, signals for latching data in respective image data storage registers 51, clock signals including that for timing exposure (EXPCLK). In addition, there are provided power and ground signals. The various control timing signals are provided by timing control board 38 that forms part of the control system for controlling the marking engine.

Figure 3:
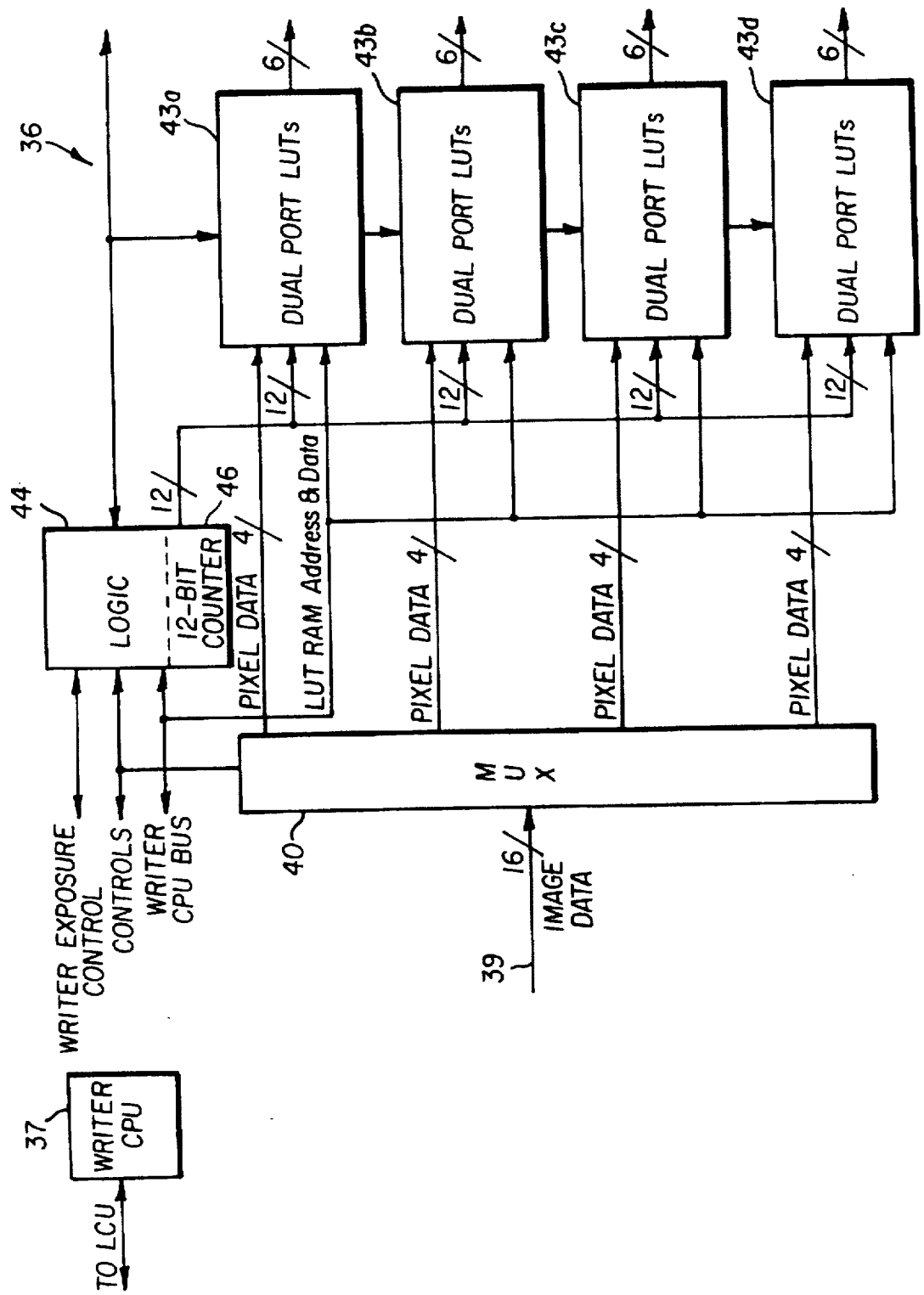
FIG. 3 is a more detailed block diagram of a portion of a writer output board shown in FIG. 2.

With reference to FIG. 3, the WIF board 36 includes a multiplexer (MUX) 40 which simultaneously receives from the merger device 34 grey level image data of up to say 4-bits per pixel bit depth for say each of four pixels. Thus, for example, grey level image data for low even-numbered LEDs, low odd-numbered LEDs, high even-numbered LEDs, and high odd-numbered LEDs are provided on bus 39 at the input of MUX 40. The image data for four pixels may be simultaneously input into the multiplexer 40 for distribution under control of control signals from a writer CPU 37 to four respective similar in construction dual port RAM look-up table (LUT) assemblages 43a, 43b, 43c and 43d. These LUT assemblages provide uniformity correction to the grey level image data being output to the printhead from the JIB 32 or image data merger logic device 34.

Figure 4:
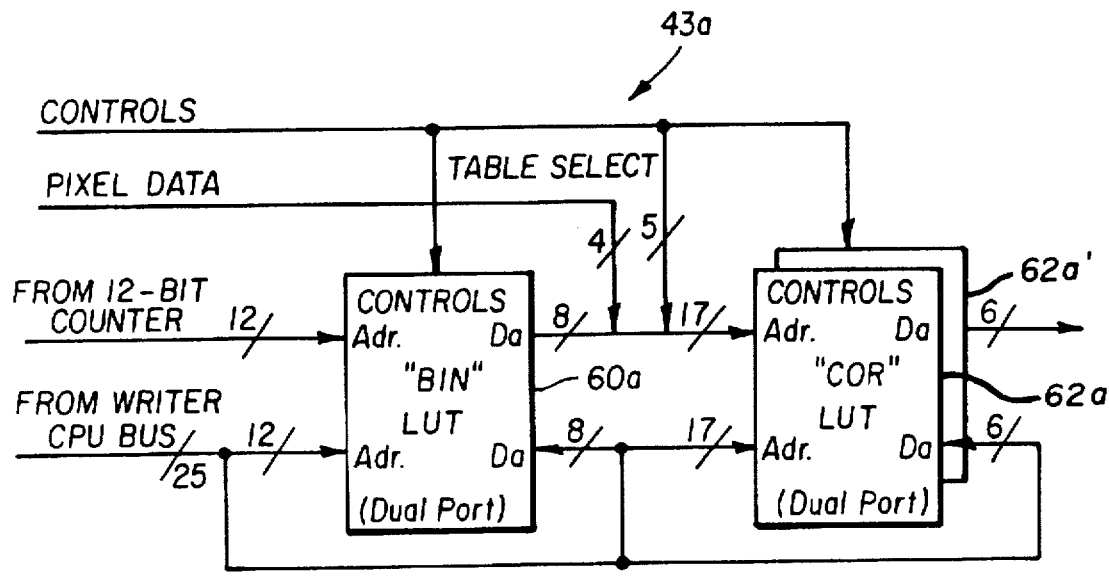
FIG. 4 is a still more detailed block diagram of a pair of dual port look-up table assemblage used in accordance with the method and apparatus of the invention.

With reference now to FIG. 4, there is shown an example of one of the dual port LUT assemblages 43a. A first part of LUT assemblage 43a includes a BIN LUT 60a wherein the low odd-numbered LEDs are categorized into 256 bins or tables wherein LEDs having similar brightness characteristics are associated in the same bin or table. A process for categorizing the LEDs into bins is described in U.S. application Ser. No. 08/175,079, filed in the name of Ajewole and now U.S. Pat. No. 5,666,150 the contents of which are incorporated herein by reference.

Figure 7:
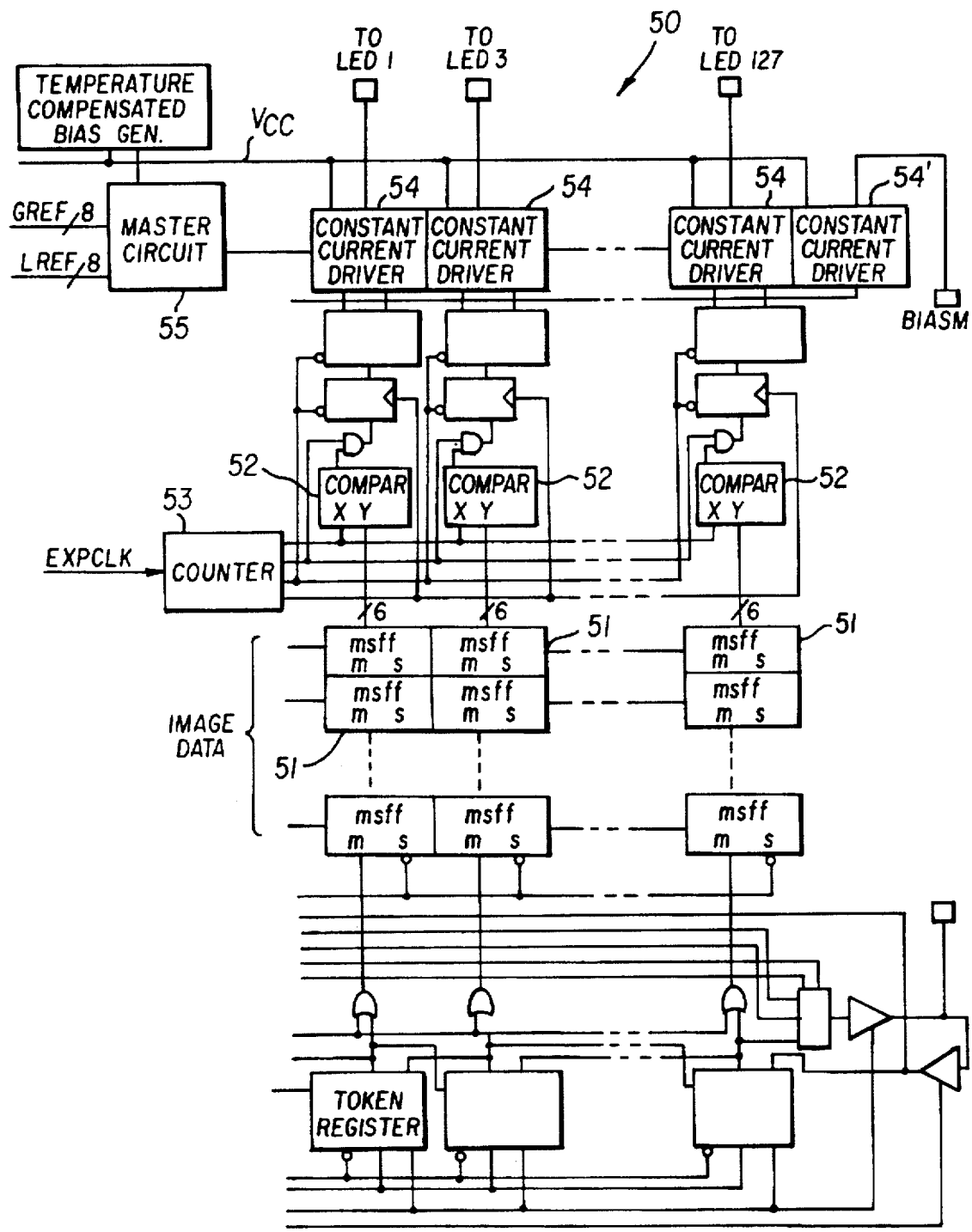
FIG. 7 illustrates three of 64 current driver channels that form a part of a driver chip that is included on the printhead of FIG. 6.

The BIN LUT is a dual port RAM that is 4-kilobytes in size and contains the 256 tables into which one quarter of the LEDs on the printhead are categorized. One port of the BIN LUT is used for loading the data representing the tables by a computer processor that may be either part of the logic and control unit or the separate writer computer processor (writer CPU) on the WIF board. The second port of the BIN LUT receives an output of a 12-bit counter 46 that counts pulses from the writer CPU 37. The output of the counter 46 represents a number 1,2, 3, 4 . . . that identifies a certain LED in the BIN LUT. For example, assume that there are 88 driver chips on the printhead for driving 44 LED chip arrays each having 128 LEDs. The driver chips as may be seen in FIG. 7 are located to both sides of the LED chip arrays and each driver chip is associated with driving one-half of the LEDs in a particular LED chip array. Odd-numbered driver chips #1–43 drive only low odd-numbered LEDs from 1–2815 and even-numbered driver chips 2–44 drive even-numbered LEDs numbered 2–2816. Similarly, odd-numbered driver chips #45–87 drive odd high-numbered LEDs 2817–5631 and even-numbered driver chips 46–88 drive high even-numbered LEDs 281 8–5632. Now odd low-numbered LEDs 1–2815 comprise 1408 LEDs which are binned in BIN LUT 60a. Even low-numbered LEDs are binned separately in a BIN LUT forming a part of a similar LUT assemblage 43b and also comprise 1408 LEDs. A similar result is true for the high-numbered LEDs that are binned respectively for odd-numbered LEDs in the BIN LUT of the LUT assemblage 43c and for the even-numbered LEDs in LUT assemblage 43d. Thus, an output of 12-bit counter 46 simultaneously may be output to one address input of each of the BIN LUTs and represents an address of a respective LED stored therein. For example the address 000000000001 represents the address of: LED #1 in the BIN LUT 60a, LED #2 in the BIN LUT of LUT assemblages 43b, LED #2817 in the BIN LUT of LUT assemblage 43c and LED 2818 in the BIN LUT of LUT assemblage 43d.

In response to the count address input to each of the BIN LUTs a respective 8-bit data output signal is provided representing a bin value number for which that LED has been assigned. At any time, the 8-bit data outputs from each BIN LUT are not necessarily the same since the respective LEDs are likely to have different brightness characteristics. The 8-bit bin value number output signal is input to one 17-bit wide data address input of a second dual port RAM 62a that forms a part of the LUT assemblage 43a. In addition to the 8-bit bin value number, there is input a 4-bit signal representing the grey level of the image data (from the merger device) and a 5-bit signal representing 32 different electrophotographic conditions that may be corrected for. The correction table 62a is of 128 kilobytes in size. This table is further divided into 32 sub-tables of 8 kilobytes in size. The table 62a contains correction data for each of the 16 grey levels at each of the 256 brightness bin values at each of the 32 electrophotographic conditions. A second set of correction tables is provided in a second correction LUT 62a' forming a part of LUT assemblage 43a so that the writer CPU processor can load newly calculated correction parameters to one set of correction tables so that the other set is used for printing.

Figure 5:
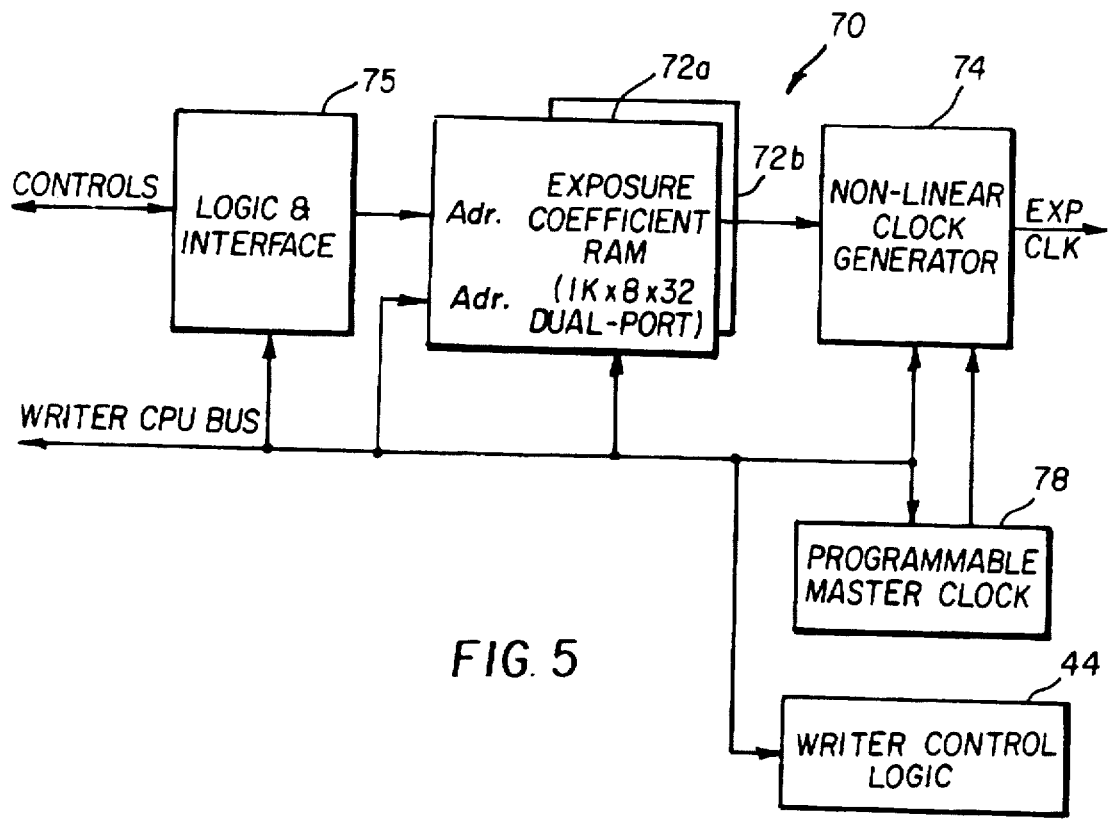
FIG. 5 is a block diagram of a non-linear clock generator forming a part of the method and apparatus of the invention.

The corrected data stored in the correction LUTs comprises tables of 6-bits/pixel data signals wherein each represents an exposure time for output to the printhead for controlling a recording duration for recording a pixel by an LED. Since four correction tables in the four LUT assemblages 43a–d are under the same clock control, there is output simultaneously to the printhead corrected image data for four LEDs on four-six bit wide image data busses. As noted in U.S. Pat. No. 5,253,934 a token clock signal may be provided to enable an appropriate data latch register 51 on a driver chip 50 to latch the appropriate corrected image data for storage therein. When the corrected data for all the LEDs is output to the printhead and latched thereon, a output latch signal is provided to output the data in the latch registers to the comparators 52 for determining enablement times of the LEDs for recording a main scan line of pixels. The comparators have an input from a down-up counter 53 which is counting exposure clock pulses (EXPCLK) to the counter. Further robustness in design is provided by having the ability to control the nature of the exposure clock. As noted in U.S. Pat. No. 5,253,934, there may be provided a non-linear exposure clock 70 (FIG. 5) as described in U.S. Pat. No. 5,300,960. With a nonlinear exposure clock, exposure clock pulses output by the clock and counted by the down-up counter 53 are not provided uniformly in time during a main scan exposure cycle. Rather the clock pulses are provided with different time spacings so as to expand out the available number of exposure times. As noted in U.S. Pat. No. 5,300,960 the clock pulses with non-uniform spacings may be provided by outputting to a programmable non-linear clock generator 74 a set of clocking data representing a count for generating the next exposure clock pulse. An example of controls for a non-linear clock generator is illustrated in FIG. 5 wherein data for "exposure coefficients" is stored in dual port RAMS 72a, 72b, each of which stores 1024 8-bit size exposure coefficients for each of 32 electrophotographic conditions. A logic and interface device 75, in response to a signal from the writer CPU provides a changing address to one of the dual ported exposure coefficients RAM 72a or 72b which is currently being used and which address during printing identifies a particular one of 32 electrophotographic conditions. The logic and interface and the writer CPU maintain control for each succeeding exposure clock pulse to be generated by identifying an address of a particular 8-bit coefficient or programmed number for output to the programmable non-linear clock generator 74. Upon receiving the 8-bit coefficient, the clock generator 74 commences to count master clock pulses from a programmable high speed (40–60 MHz) master clock generator 78. Upon reaching the programmed count established by the 8-bit coefficient, the non-linear clock generator 74 emits an exposure clock pulse to the printhead and resets whereupon the logic and interface 75 selects a new exposure coefficient from table 62a to be output to clock generator 74 for generating the next exposure pulse. Actually, in order to facilitate better timing, the loading of the next exposure coefficient into the clock generator 74 may be undertaken prior to the clock generator's 74 being reset so that the count of master clock pulses may commence directly after the resetting of the clock generator 74. The logic and interface device is programmed to select addresses of coefficients in a preprogrammed order and the exposure coefficient data at such addresses are so arranged as to provide for the desired or programmed order of exposure clock pulses being sent to the printhead. An alternative approach to generating exposure clock pulses is disclosed in U.S. application Ser. No. 07/807,522, filed in the name of Kelly et al and now U.S. Pat. No. 5,657,069, wherein sets of binary "0"s and "1"s are stored and can be loaded to a shift register so that where say a binary "1" is stored, it may be shifted out as an exposure clock pulse in response to a shift clock signal generated by a high speed master clock.

In order to achieve an even broader range of exposure correction ability, the master clock may be programmable so that it operates at any desired frequency from say 40 to 60 MHz which is adjustable in steps of 200 kHz within this range. However, during any main scan pixel line recording period the master clock 78 is fixed. The use of two dual port RAMs 72a, 72b allows for a so-called "ping-pong" type of activity wherein one may be used during printing of one main scan line of pixels while simultaneously new data is being loaded into the other in the event different environmental conditions within the copier/printer require a new set of 32 tables. After the new coefficient data is being loaded into the coefficients table 72b and/or exposure correction table 72a', printing may commence using these updated tables so that only a minimum time is used to update printing conditions.

Where the printhead is used to record image data for development in two different colors 16 sub-tables in the correction LUT 62a may be used for each of the two color toners. Since printing with different color toners may be needed on adjacent or even the same image frames, it may be desirable to have the data prestored in the LUTs so that switching of correction data for different colors may be done on a mainscan line by line basis. Even though only 16 sub-tables are provided for each color for providing a corrected exposure for each grey level, one can define 8 of these sub-tables to be used for, say, text and a different set for pictures (halftones). The operator may provide through an input on the operator control panel or a terminal or the data may otherwise be coded to cause signals to be; generated to the LCU or other control in the copier/printer to allow the copier/printer to distinguish between different image types and select a color for development of the image. Algorithms are well known for distinguishing image types when the data is electronically processed and can determine the characteristic of the data as being pictorial and suited for halftone processing or textual and suited for textual processing. Such a block of data may have a flag or control bit associated with it noting the nature of the image or its processing and this control bit may be sensed by the writer CPU to provide a signal to adjust the correction LUT and the exposure coefficient LUT 72a or 72b to select the appropriate sub-tables for the particular type of image.

Within each of the group of 8 sub-tables to be used for the different image types (text or halftone), one can have say four of these sub-tables assigned with a bit-depth of two bits per pixel and the other four sub-tables assigned a bit depth of four bits/pixel. Note that the grey level image data could be selected by the operator or be determined by the copier/printer to be 1,2 or 4-bits per pixel. For example, in operating as a printer, the printer may be attached to a source of data such as a personal computer terminal that is providing data with a bit-depth of a single bit per pixel. Other sources, be they computer terminals, networks, facsimile devices or a copier wherein a document is scanned, the data may be input and converted to a bit-depth of 2 or 4-bits per pixel. Thus, accommodation is made for each of these to correct for exposure conditions in accordance with the bit-depth of the image. In the case of the image data being of a bit-depth of 1-bit per pixel input, one may use the extreme values of either the 2 bits/pixel sub-tables or the 4 bits/pixel sub-titles, e.g. if the 2 bits/pixel table is used and the 1 bit/pixel image data signal is input, such signal may be adjusted, for example, by logic in the image data merger device or as part of a logic device associated with the WIF board 36 prior to input into the correction LUT as a 2 bits/pixel digital signal that only has values of 0 and 3. Alternatively, where input into the 4 bits/pixel correction LUT 62a, it may be first converted to a 4 bits/pixel signal only having values of 0 and 15. Such conversion may be provided by a relatively simple suitable logic device on the image data merger logic device 34 or as part of a logic device associated with the WIF board 36. The reason that one may want to use different tables for bit-depth is because in printing of text images, the inventors have found that for lower bits/pixel (like 2-bits), it may be desirable to skew the exposure value relative to the grey value to the higher side than in the case of 4 bits/pixel. For example, with a two bits/pixel grey level image the two bits/pixel are converted by the exposure correction LUT to a six bit/pixel signal for transmission to the printhead. For an LED, having an average brightness characteristic, one might expect to have the exposure range in terms of lightness space divided so that the densest pixels have the maximum exposure or a "1" or ⅔ exposure (assuming a discharge area development system), with the remainder of the exposure spectrum divided ⅔, ⅓, 0 or minimum allowed exposure. With skewing of exposures towards creation of denser pixels particularly for text type images, the lightness spectrum for an achromatic image for example may be divided so that it is now ⅔, ⅔, ½, 0. The exposure times as established by the six bits/pixel corrected signals stored in the correction LUTs 62a, 62a' thus can be adjusted to provide this skewing or bias to the creation of denser pixels for tables storing corrected exposures for text type images. For charged area development, the skewing may be in the opposite direction to create the same result. As noted above, each image type of each color is supported by four bit-depth sub-tables. These tables thus establish four exposure vs. grey level curves that are of different slopes and offsets which may be selected by customers for a different need. Of course, some help on tone reproduction curve (TRC) choices is also there in the front-end image processor where image mapping was done before the image data was sent to the WIF board. In conjunction with the corresponding non-linear exposure clock, coefficient RAM 72a (see FIG. 5), programmable master clock 78 and GREF control allow one to cover a large dynamic range of the exposure space. The second set of correction LUTs 62a' and those forming a part of LUT assemblages 43b–d can be updated based on changes in electrophotographic conditions that the process control system can sense from measuring the charge on the film web, the developed density of the toner on the film frame, temperature and humidity of the printer as well as customer programmable new desired inputs. Thus, new conditions can be calculated by the processor and input into the table through the alternate address and data inputs even when printing is in progress to select the most desirable tables to use next. It is also true that not all the tables need to be updated to save time. Between jobs or image frame, one can actually ping-pong from the first set of correction LUTs and exposure coefficient RAM tables to the second set. Therefore, high speed, high quality flexible; look-forward non-uniformity correction can be accomplished.

Other extensions in this area include using some non-volatile memory like flash memory to store some limited set of LUTs (that may include the last selected table used) instead of storing everything in volatile memory, so for quick power reset situation which does not require a fuser warm-up, the WIF board will be up and running without having to wait for LUT refill. Other extensions may include a different arrangement of LUT usage conditions.

Figure 8A:
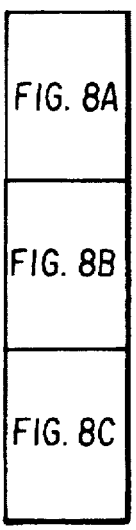
Figure 8A:
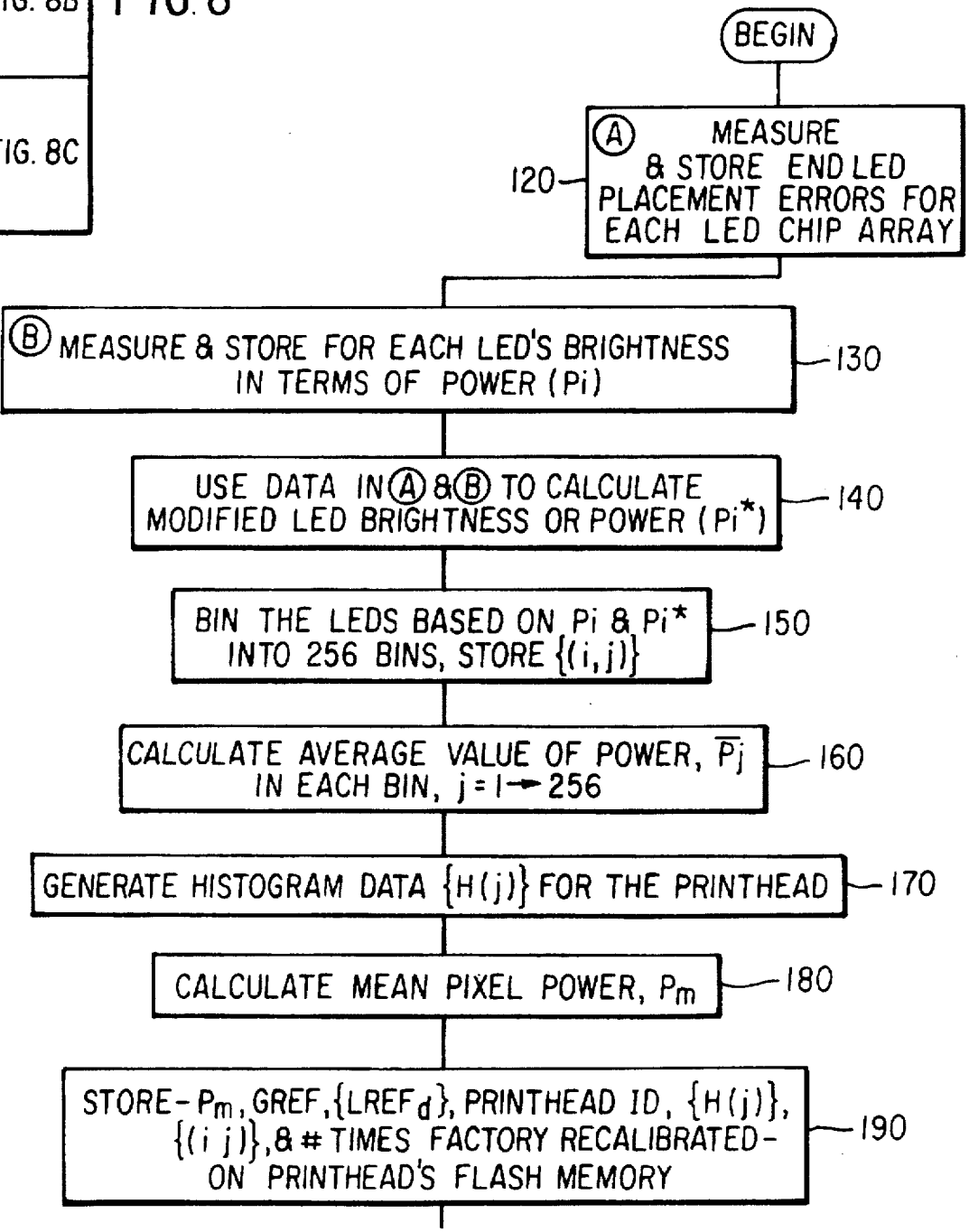

In order to speed up the calculation of the data stored in the correction tables 62a, 62a' and reduce the communication time between the printhead and the WIF board it has been found to be advantageous to organize certain data for storage on the printhead so as to resolve this problem. Associated with the printhead 22 is a secondary or printhead interface (PIF) board 82 that includes a nonvolatile flash memory 84 ($E^2$ PROM technology) and supporting circuitry 80 for interfacing the WIF board with the PIF board. The flash memory stores pre-binned data for this printhead that is to be loaded into the BIN LUTs. The pre-binned data is determined during factory calibration of the printhead wherein measurements are made of the light output of each LED in accordance with the following steps set forth in the flowchart of FIG. 8A taken in conjunction with the disclosure of U.S. application Ser. No. 08/175,079, filed in the name of Ajewole. In calibrating the LED printhead, there is attached to the printhead a lens for focusing light from the LEDs. The lens is preferably a Selfoc lens, trademark Nippon Sheet Glass Co., Ltd. However, prior to attaching the lens, in step 120 (FIG. 8A), measurements are made of the spacing between adjacent LEDs on adjacent LED chip arrays to determine spacing errors (butt-spacing errors) from the nominal 1/600th of an inch spacing existing between adjacent LEDs on the same LED chip array of a printhead that is nominally, in this example, a 600 DPI (dots per inch) printhead. As noted in U.S. Application Ser. No. 08/310,112 and now U.S. Pat. No. 5,586,055, as butt-spacing errors between abutting LED chip arrays can be somewhat offset by modifying the exposures of the LEDs that are incorrectly spaced. For example, two LEDs that are spaced further apart then nominal and used in a DAD electrophotographic process may be provided with extra exposure time than would be provided for an LED of the same brightness or power characteristic. When used in a CAD electrophotographic process system, such LEDs would be provided with less exposure time.

In step 130, there is measured and stored each LEDs brightness characteristic in terms of power $P_i$ where i is the identity of each of the LEDS from 1 to 5632. The 5632 LEDs are located in a single row on the printhead in say 44 chip arrays of 128 LEDs each so that the printhead when later mounted on the copier/printer extends perpendicular to the direction of movement of the photoconductor and extends for substantially the full width of the photoconductor.

In step 140, the data determined in steps 120 and 130 are used to calculate a modified brightness characteristic; $P_i^*$, for those LEDs found to have butt spacing errors. An algorithm for modifying brightness for such errors is described in U.S. application Ser. No. 08/310,112, the contents of which are incorporated herein by reference.

In step 150, the LEDs, based on the brightness characteristic Pi and Pi* are binned into j=1→256 bins, wherein as noted above LEDs in the same bin have almost the same brightness characteristic using $P_i$ and $P_i^*$. The identity of a bin value number for each LED is stored as a set of table values associating LED number, i, with assigned bin value numbers, wherein there are; j numbers where j=1 →256. Thus, only 8 bits need be used to identify a bin value number and there are 256 of these bin value numbers.

In step 160, the average brightness characteristic, $P_j$, is calculated for the LEDs in the j=1→256 bins. This can be a 32-bit value for each of the 256 bins.

In step 170, a histogram is developed for the printhead 22 wherein the histogram {h(j)} includes data indicating the number of LEDs grouped in each bin and the average brightness characteristic, $P_j$, for that bin.

In step 180, the mean pixel power, $P_m$, for the printhead is calculated using the values $P_i$ and $P_i^*$.

In step 190, the values of mean power, $P_m$, the histogram {H(j)}, the table set of LED bin numbers {i, j} found above are downloaded from the computer forming a part of the factory calibration equipment and stored in the flash memory 84 of the printhead's secondary interface board 82, which is a board attached to the LED printhead's support member adjacent one end of the printhead 22. Because this board is attached to the printhead, it is portable therewith so that when the printhead is factory-calibrated, the data associated with such calibration may be loaded onto the flash memory and stored and retained thereon since such memory is non-volatile. Also stored in this flash memory 84 are the printhead's identification number (ID), the number of times the printhead has been factory recalibrated and the GREF and the LREF data values used for determining the level of current in each driver channel during the factory calibration process when the LEDs are enabled and their brightness characteristics measured and stored in the computer associated with the calibration process. As noted above, the LREF values are; different from driver chip to driver chip so these are stored as a table set of 8-bit values {LREF$_d$} wherein d=1 →88 for the 88 driver chips on this printhead so that the LREF data is identified with the driver chip it is associated with. These LREF values are those used to balance LED array brightness from driver chip to driver chip when the LEDs are energized for the same exposure period.

After factory calibration of the printhead assembly which refers to a calibration when the printhead and its lens are not on the copier/printer, the printhead assembly is mounted on the copier/printer.

Figure 8B:
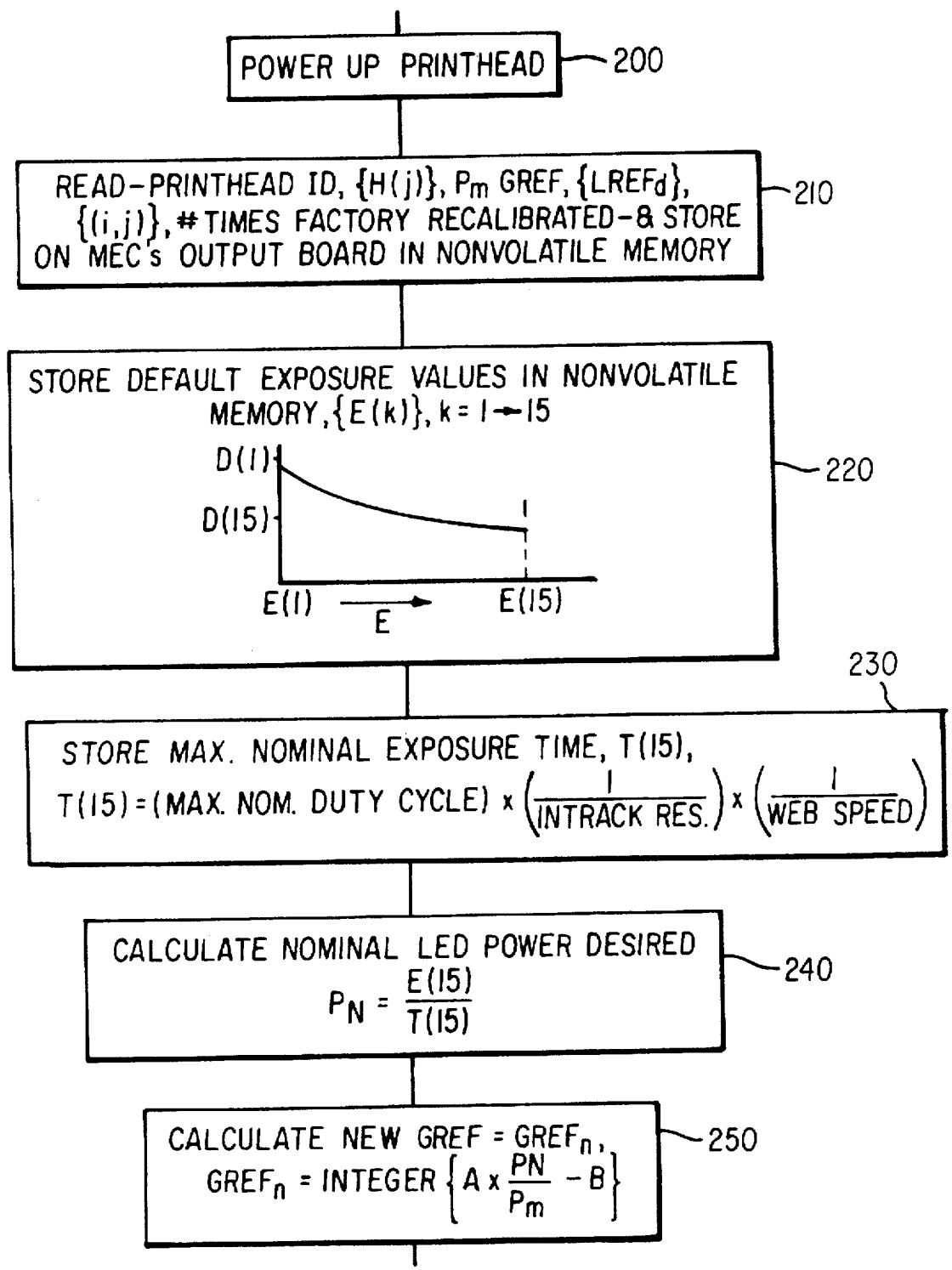
Figure 8C:
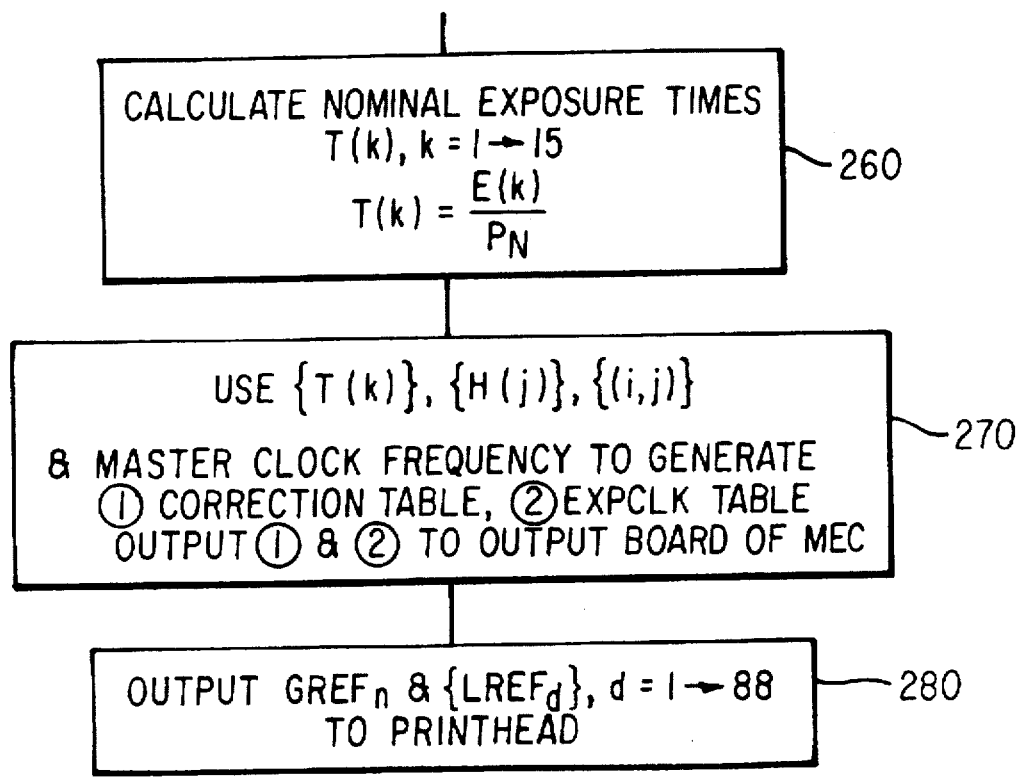

After the printhead assembly is mounted on the copier/printer power signals are applied to the printhead, step 200, FIG. 8B. A control signal or a power on-reset signal from writer CPU on the primary WIF board is provided to a conventional memory control chip 80 on the secondary interface board 82 on the printhead. In response to this control signal, the printhead ID is output to the writer CPU and compared with a printhead ID number previously stored in a nonvolatile memory on the WIF board and forming a part of the writer CPU and representing the ID of the printhead last used on this copier/printer apparatus. It is then determined if this is a newly mounted printhead. If this is determined to be a newly mounted printhead, a signal is provided to the secondary interface board to read the additional data that is stored in the printhead's flash memory 84 pursuant to step 190. This data is now read from the flash memory 84 and output on the control bus to the WIF output board 36 for stored in a memory forming a part of writer CPU 37, step 210. Also stored in a nonvolatile memory forming a part of the writer CPU are default exposure values which represent, for the electrophotographic process of this copier/printer ballpark or approximate suitable exposures energies expected for each of the grey values. Thus, in a system using 4-bits/pixel there are 15 exposure levels definable so one may define through experimentation with this type of system a typical exposure curve showing a relationship between density or lightness and exposure, E. Thus, the default exposure values represent a set {E(k)}, with k=1→15, step 220. Preferably, the default exposure values are associated with a preferred one of the development stations that are mounted for use. The stations may be encoded and the code communicated by the LCU ;to the writer CPU.

In step 230, the maximum nominal exposure time T(15) is determined wherein T(15) is the product of the maximum nominal duty cycle multiplied by the reciprocal of the in-track resolution and the reciprocal of the photoconductive web speed. The maximum nominal duty cycle represents the percentage of the available recording time between main line exposure periods and it has been found to be desirable to have the maximum nominal exposure for an LED of mean brightness be about 40% of the total available main line exposure period. Note that some LEDs on this printhead that are less powerful light emitters may have maximum exposure periods that are greater than 40% of the total available main line exposure period. The in-track resolution for this printhead may be made identical with the cross-track resolution. Thus, if a 600 DPI printhead is used, the cross-track resolution is 600 DPI and the in-track resolution may be set to have an in-track resolution of 600 DPI also. This is merely a preferred example. The in-track resolution may be made higher or lower than that of the cross-track direction.

In step 240, the nominal LED power desired $P_n$ is calculated by dividing the maximum default exposure time E(15) by the maximum nominal exposure time T(15) calculated in step 230. In step 250, a new GREF, GREF$_n$, is calculated by multiplying a constant, A, by the ratio of the nominal LED power desired, $P_n$, to the mean pixel power, $P_m$, determined during factory calibration of this particular printhead. From this product, there is subtracted a second constant B. Examples of values for A and B found to be useful in a specific process and circuit are 270 and 185, respectively, so that where $P_m = P_N$ a $GREF_n$ value of 85 is calculated and may be suitable to use.

In step 260, the set of nominal exposure times, $\{T(k)\}$ for each of the 15 exposures is made by dividing the various default exposures, $E(k)$ by the calculated nominal LED power $P_N$. In step 270, the values of the set of nominal exposure times, the printhead histogram, the bin table determinations and master clock frequency are used by the writer CPU to generate the LUT correction table values and the exposure clock table values. These tables are calculated by a program resident in the writer CPU using algorithms similar to that described in U.S. application Ser. No. 08/175,079, filed in the name of Isaac Ajewole and input into the Bin LUTs of the respective LUT assemblages 43a–d. There is also output from the WIF board 36 to the printhead the values of GREF that were calculated and the set of LREF values $\{LREF_d\}$ that were used during calibration.

Figure 9:
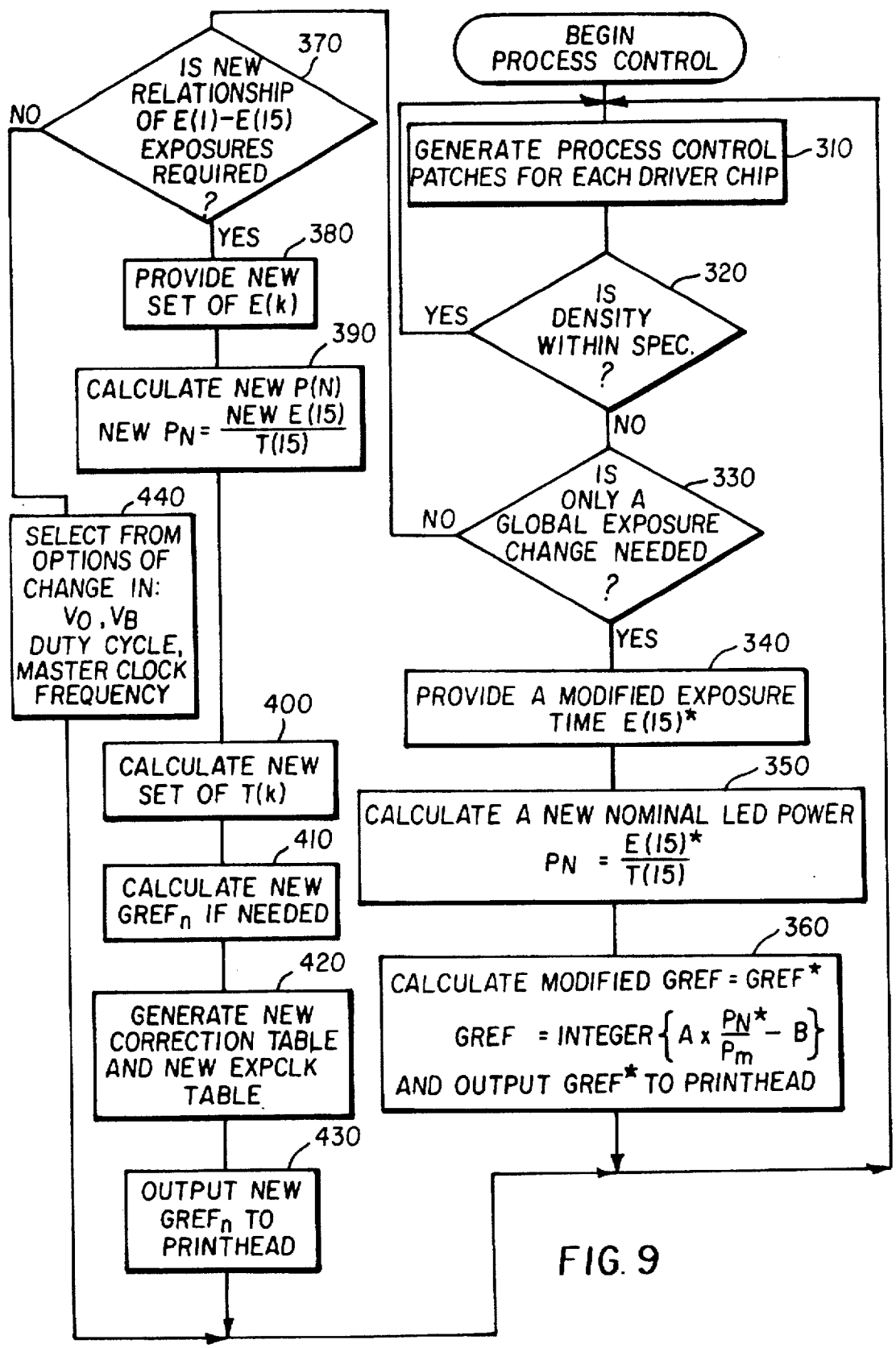
FIG. 9 illustrates a flowchart for use in providing adjustments to correction data when needed during normal use of the printhead.

With reference to the flowchart of FIG. 9 during normal use of the copier/printer the MEC 30 is programmed to create a process control mode for determining if the printhead is still within calibration specifications. This may be done by operating the printhead using test image data as noted above to expose process control patches on the belt 12. Thus, every five or six image frames may be exposed at interframe locations using selected LEDs in each of the driver chips so that the characteristics of each driver chip can be tested, step 310. The electrostatic charge on these patches may be sensed by the electrometers 50 located downstream of the printhead. In addition, the patches may be developed and sensed by densitometer 76 to determine density. The values sensed may be compared with specifications established heuristically and a determination made by the MEC 30 as to whether or not density and/or exposure is within specification limits, step 320. If the specification is met, then the printhead is operating satisfactorily. Assuming the answer is "no," a further determination is made as to whether or not a global exposure change is needed.

A determination of whether or not a global exposure change is needed is based on such criteria as whether readings from the patches from all the driver chips indicate that a change to the current in all the driver chips would result in returning exposure and/or density to within specification. Other criteria which may also be considered include the current level in the driver channels. This may be examined by enabling an extra current generating channel 54' in each driver chip and monitoring its output via an A/D converter 86 on the printhead's secondary interface board 82. During monitoring current level values that are determined are stored in flash memory 84 and output to the writer CPU when called for. Techniques for monitoring such bias currents (BIASM or bias monitoring mode) are described in U.S. Pat. No. 5,253,934. If such criteria are met, the writer CPU generates a modified exposure time E(15)* based on whether exposure needs to be increased or decreased at the maximum exposure level, step 340. A new nominal LED power PN* is then calculate.d by dividing the modified exposure time by the maximum nominal exposure time T(15), step 350. In step 360, a modified GREF, GREF* is calculated using the same formula as used in step 250, but using the new nominal LED power (PN*) calculated in step 350. Normal production printing can continue while the process control determinations of steps 320 through 350 are being made using the parameters presently being used for printing. However, at the next recording image frame or even at a line within an interframe, the modified GREF* is sent out to the printhead and loaded into all the driver chips. This modified GREF*, when output to the driver transistors in the master circuit of the driver chips, will cause a change in the current to the LEDs during their enablement. This process repeats on a routine basis to ensure that corrections made are sufficient to bring exposure and/or density within specification.

In the event that it is determined that a global exposure is not indicated a determination is made in step 370 as to whether or not a new relationship between default or the presently used set of exposure values $E(1) \to E(15)$ is required. Such determination may result by examination of patches exposed with different densities or by a change of type of image; i.e., halftone or text or detection of environmental changes in the marking engine. If such is not indicated, then the program may select from various predetermined options such as changes to $V_o$, $V_B$, increasing or decreasing the duty cycle or changing the frequency of master clock 78 to effect changes in the exposure clock pulses (step 440). If in step 370 a new set of exposure values is required, a new set of exposure values is called up in memory by the writer CPU based on programmed sets that have been determined heuristically, step 380. The writer CPU then calculates a new nominal LED power (NEW $P_N$=NEW $E(15)/T(15)$), step 390. This value of NEW $P_N$ is then used in step 400 to calculate a new set of nominal exposure times for each of the grey levels, see step 260. If a global exposure change is needed, a new $GREF_n$ is also calculated using the formula of step 360 and the new value of $P_N$. In step 420, the writer CPU generates a new correction table and if needed, a new exposure clock table. The values for the new correction tables are output to dual port memory 62a' of LUT assemblages 43a and those correspondingly located within LUT assemblages 43b–d while printing is still being made using correction values in correction table 62a and those correspondingly in LUT assemblages 43b–d. The new correction values are input using signals from the writer CPU into a secondary data input using a secondary data address input of the correction LUT 62a'. After input of the new correction values and output of a new $GREF_n$ to the printhead (step 430), printing may commence using the new correction values in the LUT 62a'.

As described above, it may be seen that upon each power-up (regular or after an emergency power interrupt:) the copier/printer apparatus provides a check of the printhead ID. If the ID of the printhead matches that of the ID stored in the copier/printer's nonvolatile memory, there is no need to read all the data from the printhead until a new printhead is installed or the battery backup system was serviced. The prebinned data required to be stored in the flash memory 84 resident on the printhead is reduce.d in size since the data for each bin has an associated bin value number which can be say 8-bits in size while absolute brightness values might require 32-bits of data for each of the thousands of LEDs. There is thus some saving in the flash memory storage requirements for storing the data "prebinned" i.e., in terms of bin assignment values. In addition, there is savings in communication time between the flash memory on the printhead and the WIF board by transmitting the prebinned data rather than the absolute brightness data. Further savings arise by eliminating the need of the writer CPU to recalculate bin value numbers on each time a printhead is changed or power is lost and there is no need for the writer CPU to calculate bin value numbers for LEDs having butt-spacing errors since such is stored prebinned on the flash memory 84.

Although the above description is with respect to a copier/printer having an LED printhead, the invention is also applicable to copier/printers that include two or more printheads. The invention is also used in copier/printers wherein two or more color images are formed on the photoconductor in one image frame or on separate image frames and then combined on an intermediate member or on an ultimate receiver sheet such as plain paper.

Modifications also contemplated in the invention include optimization of the master clock frequency to get better uniformly correction and finer adjustment in global exposure change (finer than using GREF above). Thus, if the smallest increment in GREF provides a relatively large step increase in current, finer adjustment can be obtained by adjustments in master clock frequency (say with 200 kHz increments) which thus modifies the generation of the nonlinear exposure clock pulses. Where aging of the printhead adversely affects brightness output of the LEDs, increasing the mean duty ratio to greater than 40% say to as high as 50% may be done and tables adjusted according to extend the life of the printhead without need to return to the factory for recalibration. Non-volatile memory on the WIF board may also be used to store the last selected tables used in the LUT assemblages so that for a quick power reset situation where the fuser has not yet cooled down and thus requires no warm-up, the WIF will be up and running by loading this one table into the LUT assemblages while an entirely new set of correction table values is calculated for the correction LUT and stored allowing printing using the last values. Alternatively, image data correction may be provided directly by using the last table values in the nonvolatile memory in lieu of loading these last table values in the LUT assemblages.

Although the invention has been described with reference to LED printheads, the invention is applicable to other types of printheads having plural elements that require correction and is not limited to electrophotography but will find utility in other printing technologies. While the drawings illustrate the correction LUTs as separate memories, they may be combined as one large memory Thus, advantageously, new correction values are calculated in response to process conditions and loaded into correction memory while values currently in the correction LUTs are being used to continue printing so that no delay in printing is required to load the new table values into the LUT memory. Once the new correction table values are calculated and input into the correction LUTs, the writer CPU provides a signal to the correction table assemblages causing the new tables to be used.

The invention has been described with reference to specific preferred embodiments; however, variations and modifications may be effected within the spirit and scope of the invention.

We claim:

1. A non-impact printer apparatus comprising:
a printhead, including a plurality of recording elements, for recording image data, the recording elements emitting radiation for recording on a recording medium;
correction means for correcting for nonuniformities in the recording elements, said correction means including (a) a first dual port read/write look-up table memory means for storing bin data representing bin numbers based on emission characteristics of the recording elements, wherein at N addresses in said first memory means, bin data, representing M different bin value numbers are stored, wherein N and M are each plural numbers and N>M, said first memory means having an output for outputting signals representing bin numbers;

(b) a second dual port read/write look-up table memory means storing corrected exposure data in plural tables, said second memory means having one address input port connected to the output of the first memory means, and said second memory means having an output for outputting a signal representing corrected exposure data from one of the plural tables;

(c) means for providing image data of a pixel to be printed to said one address input port of said second memory means; and (d) means responsive to a change in a process condition for selecting a different table of corrected exposure data in said second memory means for use in outputting corrected exposure data.

2. The apparatus of claim 1 in combination with a recording member that is responsive to radiation from the recording elements and at least two development stations for developing in different colors images recorded on the recording member and wherein said change in process condition includes a change in color of an image to be recorded.

3. The apparatus of claim 1 and wherein said second memory means stores tables of correction data for different bit depths of image data.

4. The apparatus of claim 1 and wherein said second memory means stores tables of correction data for different image types.

5. The apparatus of claim 1 in combination with a recording member that is responsive to radiation from the recording elements; means for developing images recorded on the recorded member; said second memory means having a second input port for addressing locations in said second memory means for inputting new correction data and means for loading new correction data to said second memory means using said second input port while correcting image data using said one input port.

6. The apparatus of claim 1 in combination with a third dual port read/write look-up table memory means for storing clock related data for use in generating non-linear clock pulses.

7. The apparatus of claim 6 in combination with a non-linear clock generator and wherein said look-up table memory means has an output providing clock related data to said non-linear clock generator and means for loading new clock related data into said third memory means while said third memory means outputs clock related data to said non-linear clock generator.

8. A method for correcting for nonuniformities in a printhead having a plurality of recording elements, said method comprising (a) storing in a first dual port read/write look-up table memory bin data representing bin value numbers based on emission characteristic of the recording elements, wherein at N addresses in said memory, bin data, representing M different bin value numbers, are stored, wherein N and M are each plural numbers and N>M;

(b) storing in a second dual port read/write look-up table memory corrected exposure data in plural tables;

(c) providing grey level image data of a pixel to be printed to said second memory means;

(d) in response to bin data and grey level image data from one of the tables outputting from said second memory, a signal representing corrected exposure data from one of the tables; and (e) in response to a change in a process condition selecting a different table of corrected exposure data in said second memory means for use in outputting corrected exposure data.

9. The method of claim 8 and wherein said change in process condition includes a change in color of an image to be recorded.

10. The method of claim 8 and wherein said second memory stores tables of correction data for different bit depths of image data.

11. The method of claim 8 and wherein said second memory stores tables of correction data for different image types.

12. The method of claim 8 and including inputting new correction data to said second memory while simultaneously outputting corrected image data from said second memory for use in printing.

* * * * *